Patented Nov. 22, 1949

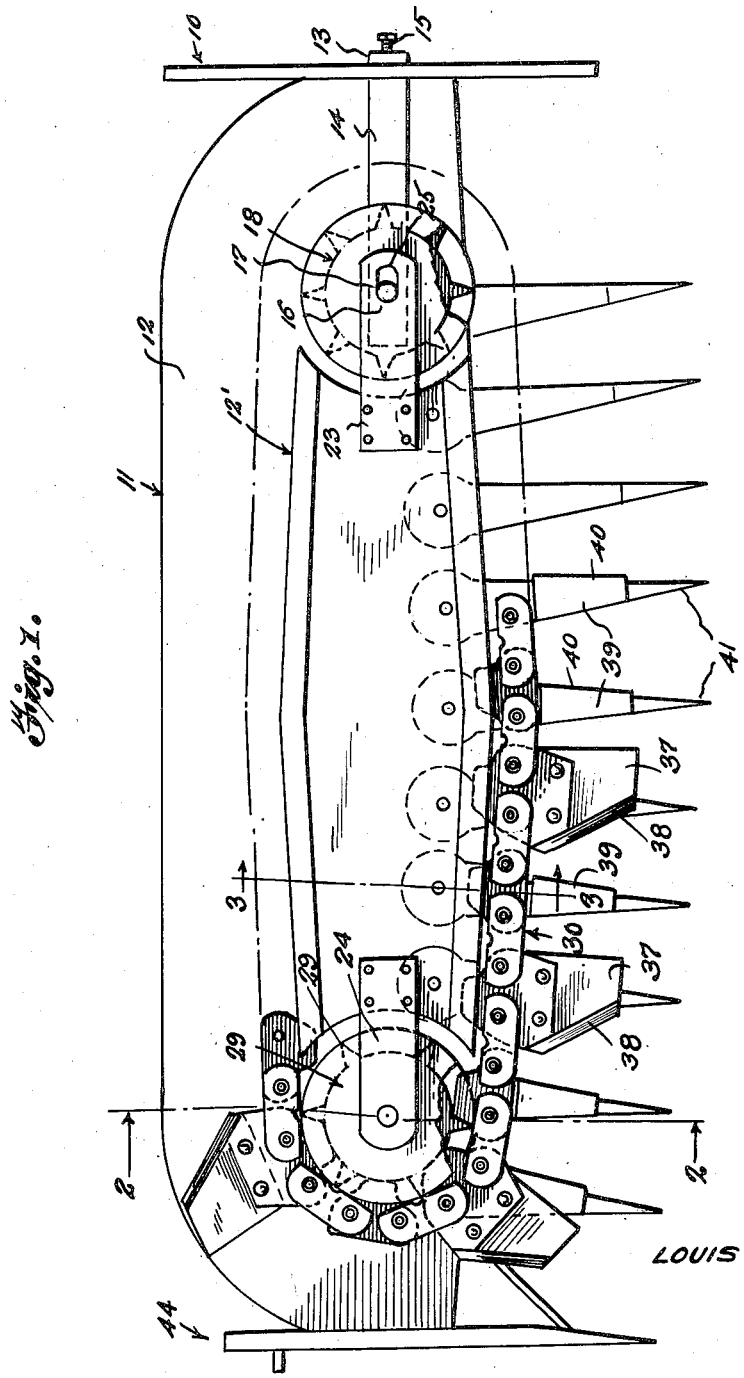

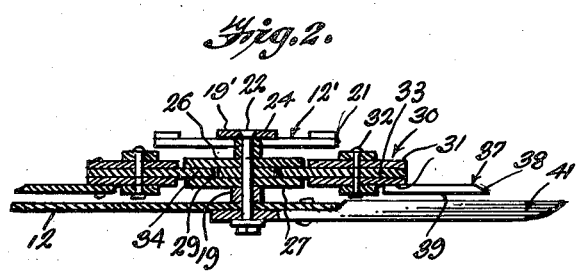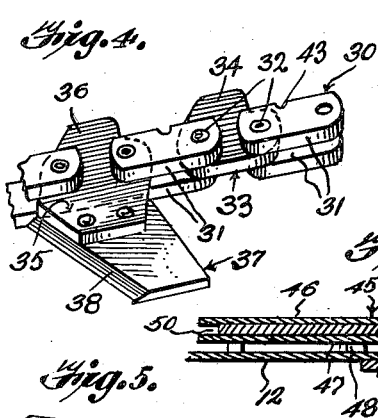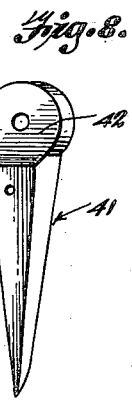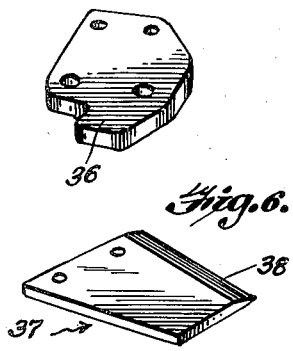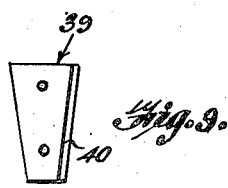
Inventor
LOUIS J. YOUNG

2,488,886

UNITED STATES PATENT OFFICE 2,488,886

MOWING MACHINE

Louis J. Young, Etna, Calif.

Application December 6, 1946, Serial No. 714,430

4 Claims. (Cl. 56—291)

This invention relates to improvements in mowing machines of the type involving an endless chain or belt moving in a horizontal plane and carrying cutter blades into shearing relation to stationary fingers, and the primary object of this invention is to provide a mowing machine of this character which can be operated at greater than usual speeds without undesirable vibration whereby more efficient mowing can be performed more quickly.

Another important object of this invention is to provide a lightweight mowing attachment which can be installed on any suitable vehicle, said attachment being constituted principally of light gauge metal plate material instead of the more usual heavy gauge material and weighty castings or forgings.

Other important objects and advantages of this invention will be apparent from the following description and the drawings appended thereto, wherein merely for purposes of illustration, a preferred embodiment thereof is set forth in detail.

In the drawings:

Figure 1 is a top plan view, partly broken away to show structural details;

Figure 2 is a transverse section taken on the line 2—2 of Figure 1;

Figure 3 is a fragmentary transverse section taken on the line 3—3 of Figure 1;

Figure 4 is an enlarged fragmentary perspective view of a portion of the knife or blade carrying chain;

Figures 5, 6, 7, 8 and 9 are perspective views of a chain center link, a chain, knife or blade, a middle chain link, a finger or guard, and a guard knife or blade, respectively.

Referring to the drawings in detail, the numeral 10 generally designates a suitable support member which is attachable to any suitable vehicle having power means for driving the mowing attachment which is generally designated 11.

The mowing attachment 11 comprises the horizontal oblong pan or plate 12 which is mounted on the support member 10 and includes at 10 a bracket 13, from which there extends a chain tightener bar 14 having screw adjustment means 15 associated with the bracket 13. The inward part of the bar 14 is slotted as indicated at 16, to pass the shaft 17 of the adjacent chain sprocket wheel 18, said shaft 17 being connected by suitable means to a driving power (not shown), preferably on the vehicle carrying the mowing attachment 11.

On the pan 12 are mounted the chain sprocket wheel 18 and the chain sprocket wheel 21, their respective shafts 17 and 22 being journaled in and rising from the pan 12 and in related brackets 23 and 24 respectively, supported from the pan 12 inwardly of the sprocket wheels, the bracket 23 being slotted at 25 to permit tightening of the chain.

As indicated in Figure 2, the sprocket wheels are preferably formed of upper and lower plates 26 and 27, and an intermediate plate 28 having notches in its edges set back from the edges of the other plates in order to define sprocket teeth 29. The sprocket wheels are spaced upwardly from the pan 12 by means of washers 19 and washers 19' space the upper side of the wheels from the upper cover plate 12'.

The sprocket chain, which is generally designated 30 comprises pairs of upper and lower connecting links 31, whose opposite ends are pivoted as indicated at 32 to runner links 33 which have extensions 34 which project into the notches of plate 28 to mesh with the sprocket wheel teeth 29, as shown in Figure 2.

At suitable similar intervals along the chain 30, the runner links 33 are replaced by blade links 35 which have projections 36 to mesh with the sprocket teeth 29. The blade links 35 are larger than the runner links 33 and have attached to the underside thereof, one end of the wedge shaped blades 37 which are beveled along their leading edges to define cutting edges 38, and project outwardly from the chain 30 in the path of the wedge shaped stationary guard blades 39 which have trailing cutting edges 40 for cooperation with the edges 38 of the knives or blades 37 as the chain 30 moves in the direction of the arrow in Figure 1.

The guard blades 39 are fixedly mounted on the upper surfaces of spike shaped guards or fingers 41 which project outwardly from the front edges of the pan 12 under the chain 30, as shown in Figure 3, the circular heads 42 being somewhat depressed and secured to the underside of the pan 12. As the chain 30 revolves, with the sustaining vehicle moving forward, the plants to be mowed move into position between the fingers 41, which are provided only on the front of the mower, and are sheared off between the cutting edges of the guard blades 39 and knives 37 as the knives pass over the guard blades.

The teeth of the sprocket wheels 18 and 21 move the chain 30 by reason of their engagement with notches 43 in the inner edges of the connecting links 31. A swathboard 44 may be connected to the outer end of the pan 12. The power from the conveying vehicle will preferably be applied to the inner sprocket wheel 18.

A guide bar 45, composed of top and bottom plates 46 and 47, respectively, and an inturned plate 48, is disposed between the sprocket wheels 18 and 21 and preferably supported on pan 12, so that plate 48 aligns with teeth 29. Plate 48 is narrower than plates 46 and 47 to form forwardly and rearwardly opening channels 49 and 50, respectively, for guiding the front and rear flights of chain 30 in their movement between sprocket wheels 18 and 21 by engagement with extensions 34 and 36.

Various modifications and changes are contemplated and may obviously be resorted to, without departing from the spirit and scope of the invention as hereinafter defined by the appended claims.

I claim:

1. A mowing machine comprising a horizontal support adapted for mounting at one end to a conveying vehicle and having a ground engaging swathboard at the opposite end, a spaced pair of sprocket wheels mounted on said support with their axes vertical, said sprocket wheels having circumferentially spaced outwardly opening notches defining the teeth thereof, an endless sprocket chain trained around said sprocket wheels and supported thereby above said support, said chain including alternately disposed runner links having inwardly extending projections engaging in the notches and meshing with the teeth, some of said runner links having outwardly projecting blade supports and constituting blade links, blades detachably mounted on the undersides of said blade supports, and fixed guard fingers projecting forwardly from said support beneath said chain and the blade links.

2. A mowing machine comprising a horizontal support adapted for mounting at one end to a conveying vehicle and having a ground engaging swathboard at the opposite end, a spaced pair of sprocket wheels mounted on said support with their axes vertical, said sprocket wheels having slotted teeth, an endless sprocket chain trained around said sprocket wheels and supported thereby above said support, said chain comprising connecting links formed with notches operatively engaged by said sprocket teeth, runner links connected to and between said connecting links and having extensions running in the slots of the sprocket wheel teeth, some of said runner links having outwardly projecting blade supports and constituting blade links, blades detachably connected to the undersides of the blade supports, fixed guard fingers projecting forwardly from said support beneath said chain and the blade links, and guard blades detachably mounted on the guard fingers in shearing relation to the blades on said blade links.

3. A mowing machine comprising a horizontal support adapted to be supported by a conveying vehicle, a pair of driven sprocket wheels journaled on the support, one adjacent each end thereof, each of the sprocket wheels comprising three plates including an intermediate plate provided with circumferentially spaced outwardly opening recesses defining sprocket teeth therebetween, an endless chain trained over the sprocket wheels including alternate connecting links and runner links, said runner links having inwardly extending projections for engaging in the sprocket recesses and meshing with the teeth, certain of the runner links having outwardly extending blade supports, cutter blades detachably mounted beneath the blade supports, fixed guard fingers projecting from one edge of the horizontal support and over which said blades are movable, fixed cutting blades detachably mounted on the guard fingers in shearing relationship to the movable cutter blades, and a multi-ply guide plate mounted on the horizontal support and extending between the sprocket wheels including an intermediate ply narrower than top and bottom plies thereof to define a guide channel along each longitudinal edge thereof to slidably receive the runner link projections for guiding the chain links in their movement between the sprocket wheels.

4. A mowing machine as in claim 3, the forward edge of the horizontal support from which the guard fingers project being outwardly bowed, and said guide plate having outwardly bowed longitudinal edges for tensioning the chain and to cause the blades carried by the forward flight thereof to follow the curvature of the guard fingers.

LOUIS J. YOUNG.

REFERENCES CITED

The following references are of record in the file of this patent:

UNITED STATES PATENTS

| Number | Name | Date |
|---|---|---|
| 157,243 | Sweet | Nov. 24, 1874 |
| 571,904 | Lankford | Nov. 24, 1896 |
| 673,389 | Denton | May 7, 1901 |
| 1,105,483 | Campbell | July 28, 1914 |